United States Patent Office 3,159,604
Patented Dec. 1, 1964

3,159,604
POLYURETHANE COATING COMPOSITIONS
George O. Rudkin, Jr., Wilmington, and Joseph E. Wilson, Newark, Del., and Michael A. Dunn, Philadelphia, Pa., assignors to Atlas Chemical Industries, Inc., a corporation of Delaware
No Drawing. Filed Feb. 12, 1960, Ser. No. 8,219
4 Claims. (Cl. 260—75)

This invention relates to coating compositions and more particularly to coating compositions comprising mixtures of isocyanate modified polyesters with polyhydroxy compounds and to the method of preparing such compositions.

It is an object of the invention to provide novel coating compositions of superior abrasion resistance, toughness and resistance to chemical attack.

A further object is to provide a method for preparing the said compositions. The novel coating compositions of the invention comprise in admixture a polyoxypropylene sorbitol ether and the reaction product of an arylene diisocyanate with a hydroxyl terminated linear ethylene glycol-adipic acid polyester. The mixture may conveniently be diluted with a suitable solvent for application to a surface by brushing, spraying or dipping in accordance with well known practice. When so applied and permitted to dry for a week at room temperature the compositions cure to a hard, tough coating exhibiting excellent resistance to solvents. The curing may be accelerated by raising the temperature after most of the solvent has evaporated.

The isocyanate modified linear polyester component is prepared by reacting a stoichiometric excess of an arylene diisocyanate wih a hydroxyl terminated ethylene glycol-adipic acid polyester. Suitable arylene diisocyanate include the tolylene diisocyanates, naphthylene diisocyanates as well as diisocyanates of the diphenyl series. Tolylene diisocyanates are preferred. They are employed in a stoichiometric excess over the hydroxyl equivalent of the polyester resin, the said excess ranging from 60% to 70%. The linear polyester resin is hydroxyl terminated, i.e., it is the esterification product of 1.15 molar proportions of ethylene glycol with 1 molar proportion of adipic acid, the esterification being continued until the molecular weight is approximately 3000.

In preparing the isocyanate modified polyester an arylene diisocyanate, in 60% to 70% stoichiometric excess, is mixed with the hydroxyl terminated polyester resin under anhydrous conditions and heated moderately. A solvent, nonreactive toward isocyanate and/or hydroxyl radicals may be present, if desired, to lower the viscosity of the reacting mixture. Suitable reaction temperatures are from about 80 to 150° C. and reaction times of from 1 to 2 hours may be employed. It is essential that the reaction mixture be free of moisture and it is therefore preferred to preheat the polyester under vacuum or to dilute it with a solvent boiling well over 100° C. and distill off a portion of the solvent to entrain and carry off any residual water which may have been contained therein.

After cooling the isocyanate modified polyester to approximately room temperature it is converted to a coating composition in accordance with the invention by incorporation of a polyoxypropylene sorbitol ether containing from about 10 to about 80 oxypropylene groups per mol and, if desired, a thinning solvent for the composition. The proportion of ether to isocyanate modified polyester should be chosen to furnish no more ether hydroxyls than will react with the unreacted isocyanate groups of the modified polyester. Preferably somewhat less than the stoichiometric amount of ether is added but not less than enough to react with 50% of the available isocyanate radicals. In other words, the coating composition should comprise from 0.5 to 1.0 hydroxyl equivalents of the defined ether per isocyanate equivalent of the isocyanate modified polyester.

The coating composition is then ready to use. The shelf life is comparatively short and the composition should be used within a few days of its compounding. The isocyanate modified polyester component is moisture sensitive but may be stored if care is taken to exclude moisture. The polyoxypropylene ether component is storage stable.

A specific embodiment of the invention is described in more detail in the following example for illustrative purposes.

186.5 grams of ethylene glycol and 381.7 grams of adipic acid were first heated to 160° C. for 2 hours in a suitable vessel equipped with a Dean-Stark trap after which the temperature was taken to 220° C. and held for 22 hours. A total of 93.4 grams of condensate had been collected in the trap at this point of which approximately 7% was ethylene glycol. The reaction vessel was then evacuated to 2.5 mm. pressure and heating continued for another 7 hours at 220° to 235° C., resulting in the collection of an additional 10.5 grams of water glycol mixture to yield a hydroxyl terminated polyester of virtually zero acid number and a molecular weight of approximately 3040. Upon cooling there was obtained a waxy, pale colored solid.

A solution of 22.8 grams of the polyester in 80 mls. of chlorobenzene was refluxed briefly and then distilled until 40 ml. of distillate had been collected. This insured removal of any residual water from the solution. 2.16 grams of tolylene diisocyanate were then added to the solution and heating continued under reflux for one hour. There was thus formed a chain extended urethane-polyester polymer with terminal isocyanate groups.

The final coating composition was prepared by cooling the solution to room temperature, stirring in 1.86 grams of a polyoxypropylene sorbitol ether containing 20 oxypropylene groups per mol and thinning with an equal volume of acetone. A solution suitable for application by brushing or spraying was thus obtained. It has a shelf life of from two to four days at ordinary room temperatures. Upon application as a lacquer or varnish film it dries and cures in one week at room temperature to a hard tough coating.

The properties of the coating can be regulated conveniently by changing the oxypropylene content of the polyoxypropylene sorbitol ether component of the final ingredient. Thus by substituting an equimolar proportion of the ether containing 80 oxypropylene groups per mol for the ether shown in the foregoing example, a coating composition is obtained which cures to a tougher, more flexible and more resilient coating. Conversely, replacement with an equimolar proportion of the polyoxypropylene ether of sorbitol containing 10 oxypropylene groups per mol yields a coating composition which cures to a harder film of greater abrasion and chemical resistance.

What is claimed is:

1. A coating composition comprising from 0.5 to 1.0 hydroxyl equivalent of a polyoxypropylene sorbitol ether containing from 10 to 80 oxypropylene groups per mol and one isocyanate equivalent of the reaction product of a hydroxyl terminated ethylene glycol adipate polyester having a molecular weight of about 3000 with a 60% to 70% stoichiometric excess of an arylene diisocyanate.

2. A coating composition comprising from 0.5 to 1.0 hydroxyl equivalents of the polyoxypropylene ether of sorbitol containing 20 oxypropylene groups per mol and one isocyanate equivalent of the reaction product of a hydroxyl terminated ethylene glycol adipate polyester having a molecular weight of about 3000 with a 60% to 70% stoichiometric excess of toluene diisocyanate.

3. The process for preparing a coating composition which comprises heating one molar proportion of the product obtained by esterifying 1.15 molar proportions of ethylene glycol with 1 molar proportion of adipic acid until the molecular weight of the formed polyester is about 3000 with from 1.6 to 1.7 molar proportions of an arylene diisocyanate at from 80° to 150° C. for from 1 to 2 hours, cooling the resulting reaction product and incorporating therein from 0.5 to 1.0 hydroxyl equivalents, per equivalent of free isocyanate in the said resulting reaction product, of a polyoxypropylene sorbitol ether containing from 10 to 80 oxypropylene groups per mol.

4. The process of claim 3 wherein the said arylene diisocyanate is toluene diisocyanate and the said polyoxypropylene ether of sorbitol contain 20 oxypropylene groups per mol.

References Cited in the file of this patent
UNITED STATES PATENTS

| 2,621,166 | Schmidt et al. | Dec. 9, 1952 |
| 2,895,603 | Freeman | July 21, 1959 |
| 2,998,403 | Muller et al. | Aug. 29, 1961 |

OTHER REFERENCES

Wilson et al.: Science, Volume 128 (No. 3335), November 28, 1958, page 1343.